United States Patent

[11] 3,534,657

[72] Inventor Hans O. Wagner
 Dusseldorf-Lohausen, Germany
[21] Appl. No. 794,276
[22] Filed Jan. 27, 1969
[45] Patented Oct. 20, 1970
[73] Assignee Schiess Aktiengesellschaft
 Dusseldorf-Oberkassel, Germany
[32] Priority Jan. 26, 1968
[33] Germany
[31] 1,652,720

[54] CARRIAGE MOVABLE ON A VERTICAL POST, ESPECIALLY FOR MACHINE TOOLS
 6 Claims, 4 Drawing Figs.
[52] U.S. Cl. .................................................. 90/14, 77/3
[51] Int. Cl. .................................................. B23c 1/02, B23b 39/00
[50] Field of Search ........................................ 90/14, 11; 77/3.1, 3; 308/6

[56] References Cited
UNITED STATES PATENTS
2,288,420 6/1942 Pegard .......................... 308/6UX
2,864,269 12/1958 Mottu ........................... 77/3

Primary Examiner—Gil Weidenfeld
Attorney—Walter Becker

ABSTRACT: A machine tool having a vertical post and a carriage vertically movable on said post, which includes: a headstock supported by said carriage and movable relative thereto in a direction transverse to the direction of movement of said carriage, rail means supported by said carriage and extending in the direction of movement of said headstock with regard to said carriage, and load conveying means interposed between said headstock and said rail means, said rail means and said load conveying means being arranged below and in a cross-sectional plane substantially extending through the center of gravity of said headstock.

INVENTOR
Hans O. Wagner

INVENTOR
Hans O. Wagner

CARRIAGE MOVABLE ON A VERTICAL POST, ESPECIALLY FOR MACHINE TOOLS

The present invention relates to a carriage movable on a vertical post, especially for machine tools. Some machine tools, especially horizontal drilling and milling machines, in addition to being equipped with a machine table have a vertical post on which a carriage is provided which is adapted to be moved upwardly and downwardly. Such carriage is equipped with a headstock which is horizontally movable outwardly to a certain extent and which comprises the drilling or milling spindle which in its turn is movable outwardly of said headstock. A headstock of this type rests primarily over the entire length of the guiding means for the carriage. When the headstock is moved outwardly to a certain extent, for instance in order to feed the tool carried by the drilling or milling spindle into the machining position, the headstock protrudes over a certain length from said carriage. As a result thereof, the jutting out portion of the headstock bends downwardly.

It is known partially to compensate for such bending by machining the guiding surfaces for the headstock and the carriage so that they form a curve similar to a large arc so that when the headstock is moved outwardly to a certain extent, the moved out portion of the headstock will after effected bending extend substantially rectilinearly so that also the axis of the drilling or milling spindle in the said protruding portion will be approximately parallel thereto. This premachining of the guiding surfaces which has to be carried out with high precision and requires numerous time consuming measuring operations brings about a partial compensation only for the bending because each deviation in the bend in conformity with which the original arched machining was calculated will bring about some lack of precision.

It is, therefore, an object of the present invention to provide a carriage which is movable on a post and is equipped with a headstock partially movable outwardly in a horizontal direction, which will be so designed that the bend of the headstock will be independent of the position of the headstock so that the originally effected machining of the guiding surfaces for the headstock in consideration of the bend in each position of the headstock will assure a precisely parallel position of the axis of the drilling and milling spindle with regard to the guiding means for the carriage.

This object and other objects and advantages of the invention will appear more clearly from the following specification in connection with the accompanying drawings in which.

Figure 1:
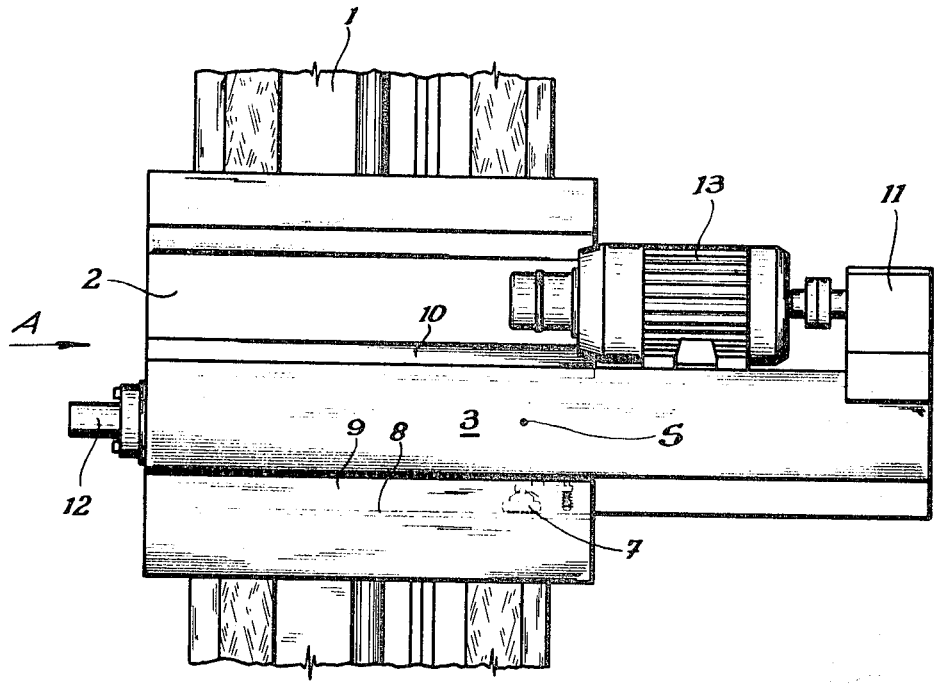
FIG. 1 is a diagrammatic illustration of a carriage movable on a post and showing the headstock in its retracted position.
Figure 2:
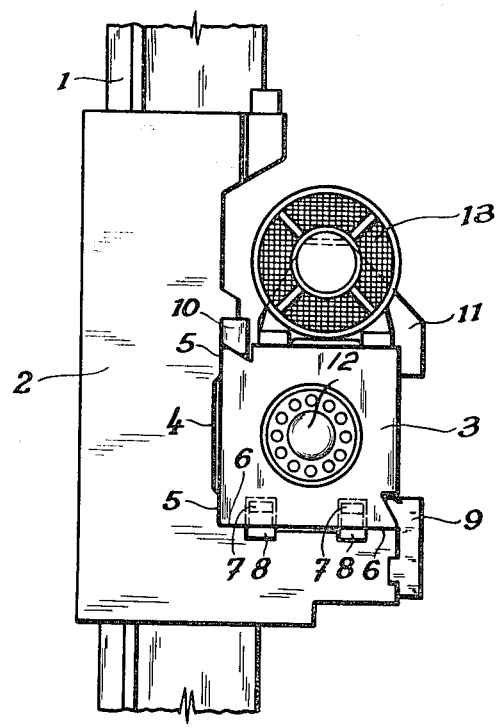
FIG. 2 is a diagrammatic showing of the carriage of FIG. 1 as seen in the direction of the arrow A.

The carriage according to the present invention is characterized primarily in that the headstock at its cross-sectional area which contains the center of gravity rests by means of one or more adjacent roller guiding or similar antifriction or guiding elements movable together with the headstock, on rails provided in said carriage.

The arrangement according to the present invention makes it possible from the very start to take into consideration the bending of the headstock inasmuch as the center of gravity of the headstock as an entity, including driving motor transmission and tool head, is ascertained and the headstock is supported in its vertical plane containing the center of gravity. In this position, the guiding surfaces of the headstock are machined plane, and the axis of the drilling and milling spindle is fixed parallel to said guiding surfaces.

When in these circumstances the cross-sectional area of the headstock which contains the center of gravity rests through one or more adjacent roller guiding or similar sliding elements movable together with the headstock on the supporting surfaces of rails provided in said carriage, it will be assured that the headstock will always regardless of whether it is moved into or partially out of the carriage, rest as to its cross-sectional portion containing the center of gravity on the said guiding surfaces. This means that when the headstock has been moved out of the carriage, the freely protruding or cantilever end of the headstock will not be subjected to any additional bending so that the precise position or location of the drilling and milling spindle will be maintained.

According to a further development of the invention, each roller guiding or similar sliding element in the carriage may have associated therewith a rail the top side of which forms a supporting surface, whereas alongside of said rails there are provided plane guiding surfaces facing the bottom surface of the headstock for receiving possibly occurring additional loads. This arrangement brings about that the cross-sectional portion of the headstock which contains the center of gravity will rest on the roller guiding elements whereas the sliding surfaces on both sides of said rails represent merely an additional support when, for instance, the free end of the headstock is additionally subjected to a load by a special tool, in other words by weights or outer cutting forces which could not be taken into consideration when ascertaining the center of gravity for the machining of the guiding surfaces.

For relieving the sliding surfaces, it is suggested according to a further development of the present invention that between the headstock and the respective roller guiding element there be provided a pivotable yoke or the like one end of which rests on the roller guiding element through the intervention of a joint or the like, whereas the other end is by means of springs adapted to be clamped to the headstock which latter over a portion of its length by means of arched pivotal surfaces rests on said yoke. By preloading the springs, for instance dish springs, to a greater extent than is required by the weight of the entire headstock, it will be assured that the guiding surfaces which absorb the upwardly directed clamping pressure are firmly pressed against the respective contacted surfaces while the headstock being relieved rests on the sliding surfaces on both sides of the rails of the roller guiding or sliding elements while an oil film can form between the downwardly directed guiding surfaces and the sliding surfaces.

According to a further development of the invention, the carriage according to the invention may be provided with a recess open toward the top and to one side for receiving the headstock. At the marginal areas of the recess, a guiding rail each connected to the carriage extends over the headstock. This makes it unnecessary so to design the carriage that it extends entirely about the headstock whereby the assembly and the machining of the guiding surfaces will be greatly facilitated.

Referring now to the drawings in detail, a carriage generally designated with the reference numeral 2 is vertically displaceably arranged on a post 1 of the respective machine tool. A headstock 3 is horizontally displaceably supported by the carriage 2. The said headstock 3 is guided in a recess provided in the carriage 2 and open toward the top and the front side. More specifically, the headstock 3 is guided along the lateral guiding surfaces 5 and in upward direction in the guiding rails 9 and 10. The headstock 3 rests in downward direction primarily on roller guiding elements 7 which are carried by the headstock 3. At the rear free end of the headstock 3 there is provided the transmission 11 with the motor 13 forming the drive for the drilling or milling spindle 12. The horizontal displacement of the headstock 3 is effected by customary driving elements not shown.

In conformity with the embodiment shown in the drawings, there are arranged below the headstock 3 and adjacent to each other two roller guiding elements 7. These roller guiding elements 7 are arranged within the region of the center of gravity S of the headstock 3. The guiding surfaces of the headstock 3 are machined plane which will correspond to the headstock being bent in conformity with its own weight so that the bend of the headstock 3 is compensated for and the guiding surfaces in the carriage 2 and thus on the headstock 3 are parallel to each other.

Figure 3:
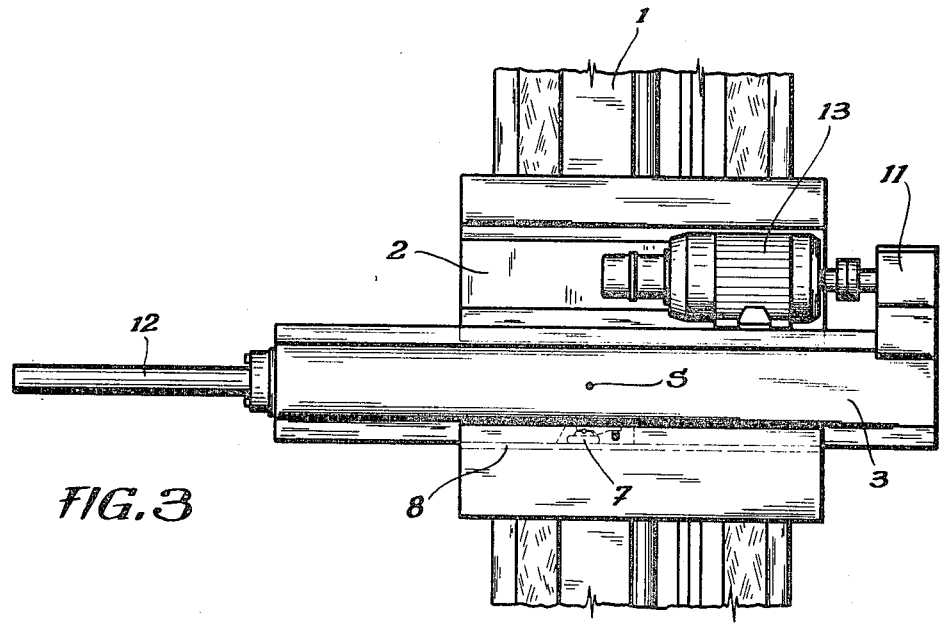
FIG. 3 shows the carriage of FIG. 1 with partially moved out headstock and with moved out drilling spindle.
Figure 4:
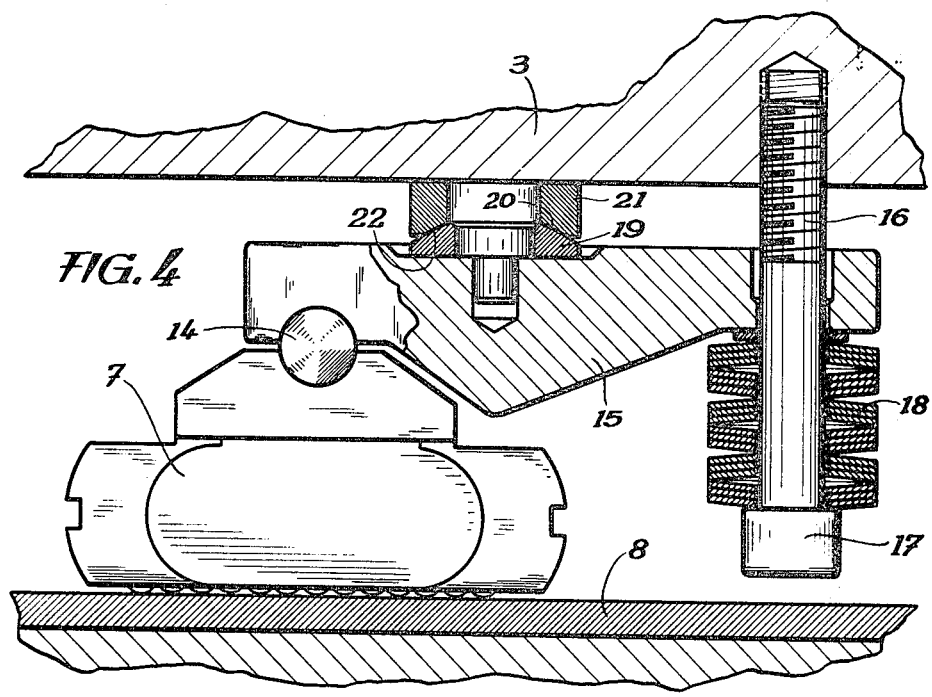
FIG. 4 illustrates on a larger scale than FIGS. 1 to 3 and partially in section the arrangement of roller guiding means between the sliding surfaces of the carriage and the headstock.

FIG. 1 shows the headstock 3 fully retracted into the carriage 2 while the roller guiding elements 7 are located in that cross-sectional region of the headstock 3 which contains the center of gravity and is located at the right-hand side of the carriage 2. When the headstock 3 is moved outwardly in conformity with FIG. 3, the headstock 3 remains as far as its cross-sectional region with the center of gravity is concerned, supported by the roller guiding elements 7 so that the outward movement of the headstock 3 will cause no change in the bending thereof. An additional slight bending may occur by the outward movement of the drilling or milling spindle 12. This additional bending, however is negligible. The headstock 3 is provided with an elastic clamping means by means of which a firm engagement between the upwardly directed guiding surfaces on the headstock 3 and the guiding rails 9 and 10 in the carriage 2 will be assured. This is brought about by the fact that the roller guiding elements 7 are in a certain way arranged below the headstock 3. The pivotal yoke 15 rests through the intervention of a cylindrical bolt 14 on each roller guiding element 7 which in its turn rests on the hardened rail 8. Through the free end of the yoke 15 extends the spring bolt 16 which is screwed into the headstock 3. Between the head 17 and the free end of the yoke 15 there is provided a dish spring packet 18 by means of which it is possible to adjust the effective clamping force of the spring bolt 16. Over a partial length of the yoke 15, between the two ends thereof, the latter carries the pivotal body 19 with the arched pivotal surface 20 on which rests the pivotal body 21 which is provided with corresponding pivotal surfaces 22 and which is connected to the headstock 3. This brings about that the headstock 3 is pressed against the guiding rails 9 and 10 of the carriage 2 by a preload which corresponds to the thrust of the dish springs 18 so that the sliding surfaces 6 are relieved whereas the support proper of the headstock 3 in the carriage 2 is effected by the rails 8 through the intervention of the two roller guiding elements 7 arranged adjacent to each other. The preload which compensates for the total weight of the headstock 3 is so adjusted as to be greater than the said total weight in order to assure a proper engagement of the guiding surfaces and a corresponding relief of the sliding surfaces 6.

Regardless of whether the headstock 3 is moved out of or into the carriage 2, the headstock 3 will only at its cross-sectional area containing the center of gravity be supported by the carriage 2 and consequently will not be subjected to an additional bending depending on its position with regard to the carriage 2. The bending due to the weight of the headstock 3 and the loads supported thereby on both sides of the said cross-sectional region are taken into consideration by the fact that the plane machining of the guiding surfaces and the arrangement of the bearings of the drilling and milling spindle 12 have been effected in bent condition of the headstock 3.

It is, of course, to be understood that the present invention is, by no means, limited to the particular showing in the drawings but also comprises modifications within the scope of the appended claims.

It is furthermore to be noted that the roller structure 7 is known per se and marketed by Scharmann & Co., Rheydt/Rhld., Germany, under the name "ROTAX tychoway". It is also to be noted that the invention is not limited to having the load conveying means 7 formed by antifriction bearing means but that instead also friction bearing means may be employed in some instances.

I claim:

1. A machine tool having a vertical post and a carriage vertically movable on said post, which includes: a headstock supported by said carriage and movable relative thereto in a direction transverse to the direction of movement of said carriage, rail means for carrying said headstock being supported by said carriage and extending in the direction of movement of said headstock with regard to said carriage, means for conveying the entire load of the headstock upon the carriage at substantially one location, said load conveying means interposed between said headstock and said rail means, and said location being substantially directly below an axis passing through the center of gravity of the headstock and being transverse to the directions of movement of said carriage and said headstock.

2. A machine tool according to claim 1, in which said load conveying means includes antifriction bearing means.

3. A machine tool according to claim 1 wherein there are at least two of said load conveying means, each of said load conveying means has associated therewith one rail means the upper surface of which is in supporting engagement with the respective load conveying means.

4. A machine tool according to claim 1, in which said load conveying means includes roller means engaging said rail means, pivotal yoke means interposed between said roller means and said headstock and having one end portion pivotally connected to and resting on said roller means, adjusting means adjustably connecting the other end portion of said yoke means to said headstock, and means respectively supported by said yoke means and said headstock and interposed therewith while being provided with interengaging spherical surfaces.

5. A machine tool according to claim 4, in which said adjusting means comprises bolt means having one end in threaded engagement with said headstock and having its other end in spaced relationship to said yoke means and provided with shoulder means, and dish spring means interposed between said yoke means and said shoulder means.

6. A machine tool according to claim 1, in which said carriage has a recess open toward the top and to one side thereof for receiving said headstock and guiding rail means substantially diametrically oppositely located to each other and connected to said carriage, said headstock being provided with guiding surfaces near the top and bottom surfaces thereof and arranged adjacent said last mentioned guiding rail means for guiding engagement therewith.